(12) United States Patent
Richardson

(10) Patent No.: US 6,860,455 B1
(45) Date of Patent: Mar. 1, 2005

(54) CONNECTING DEVICE

(75) Inventor: Cristopher Richardson, Clitheroe (GB)

(73) Assignee: Ultraframe (UK) Limited, Lancashire (GB)

( * ) Notice: Subject to any disclaimer, the term of this patent is extended or adjusted under 35 U.S.C. 154(b) by 0 days.

(21) Appl. No.: 09/582,253

(22) PCT Filed: Jan. 26, 1999

(86) PCT No.: PCT/GB99/00262

§ 371 (c)(1),
(2), (4) Date: Jun. 22, 2000

(87) PCT Pub. No.: WO99/49253

PCT Pub. Date: Sep. 30, 1999

(30) Foreign Application Priority Data

Mar. 26, 1998 (GB) ............................................ 9806428

(51) Int. Cl.⁷ ................................................. F16L 3/12
(52) U.S. Cl. .................. 248/74.1; 248/74.4; 248/316.6; 403/104
(58) Field of Search ............................... 248/74.4, 67.5, 248/316.6, 316.8, 65, 74.1, 499, 70, 68.1, 316.4; 403/104, 106; F16L 3/10

(56) References Cited

U.S. PATENT DOCUMENTS

| | | | | |
|---|---|---|---|---|
| 4,118,838 A | * | 10/1978 | Schiefer et al. ............. | 174/156 |
| 4,442,994 A | * | 4/1984 | Logsdon ..................... | 248/547 |
| 4,526,333 A | * | 7/1985 | Nakama et al. ............... | 248/73 |
| 4,771,516 A | * | 9/1988 | Foth .......................... | 24/115 R |
| 4,799,444 A | * | 1/1989 | Lisowski ................. | 114/221 R |
| 4,804,158 A | * | 2/1989 | Collins et al. ............. | 248/74.4 |
| 5,330,283 A | * | 7/1994 | Ballard ........................ | 403/97 |
| 6,312,184 B1 | * | 11/2001 | Hoshino ..................... | 403/104 |
| 6,343,772 B1 | * | 2/2002 | Oi ............................... | 248/65 |

FOREIGN PATENT DOCUMENTS

| | | | |
|---|---|---|---|
| DE | 2363687 A1 | * | 5/1975 |
| DE | 3019303 A1 | * | 11/1981 |
| EP | 0079417 A1 | * | 5/1983 |
| EP | 666443 A1 | * | 8/1995 |
| GB | 2315090 A | * | 1/1998 |
| GB | 2335725 A | * | 9/1999 |
| GB | 2359112 A | * | 8/2001 |

* cited by examiner

*Primary Examiner*—Ramon O. Ramirez
*Assistant Examiner*—Naschica S. Morrison
(74) *Attorney, Agent, or Firm*—Wood, Phillips, Katz, Clark & Mortimer

(57) ABSTRACT

A connecting device for securing a down pipe to a wall comprises a first part fixable to the surface and a second part attachable to the first part and forming an at least partial enclosure for the pipe, the attachment of the second part to the first part being selectively adjustable, whereby spacing of the pipe from the wall is adjustable. Co-operative formations prevent slidable movement of the second part relative to the first part, in a given direction along the longitudinal axis of the pipe, but permit slidable movement of the second part relative to the first part in an opposite direction, along the longitudinal axis of the pipe, once the second part has been slidably attached to the first part.

7 Claims, 5 Drawing Sheets

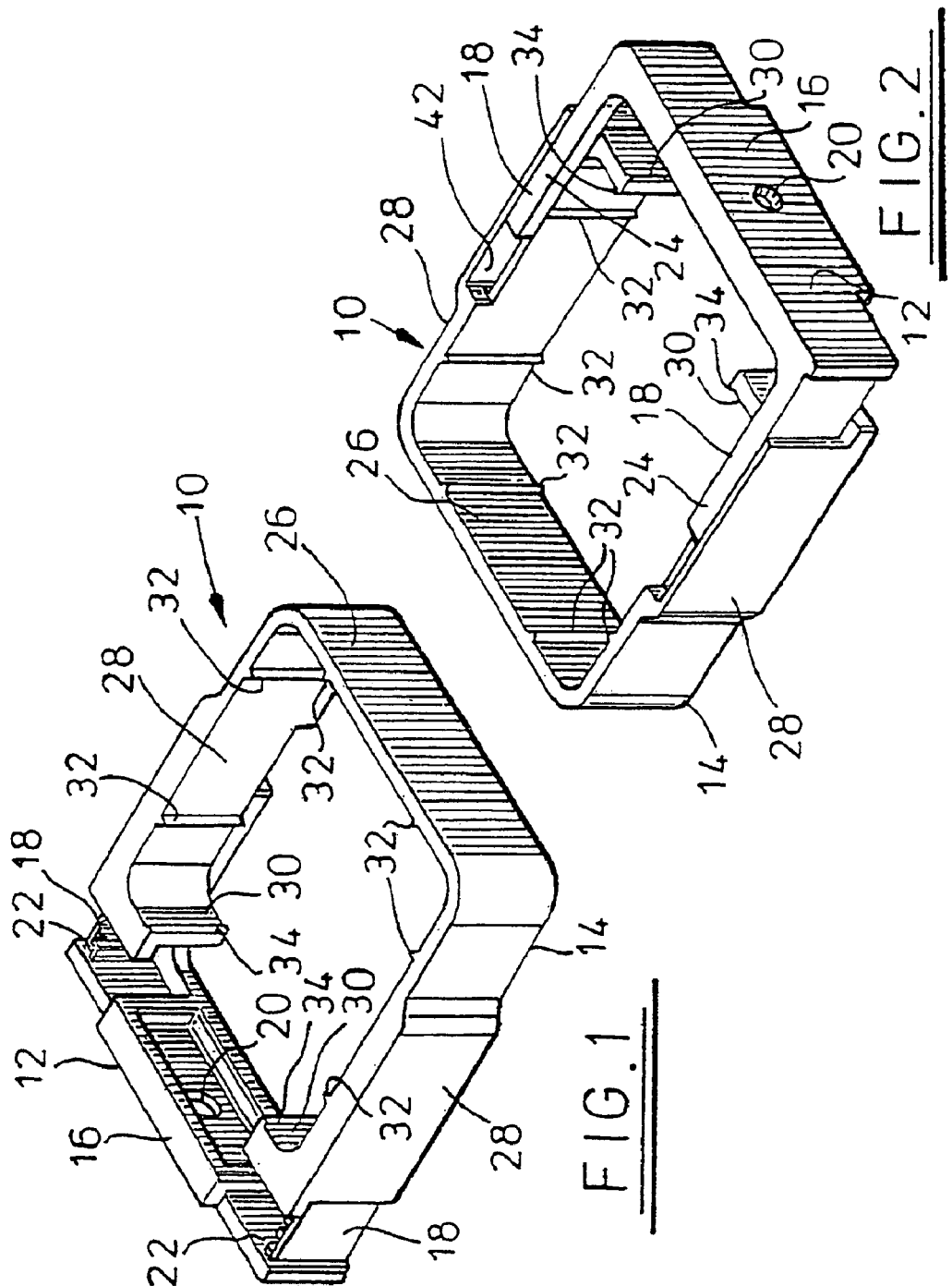

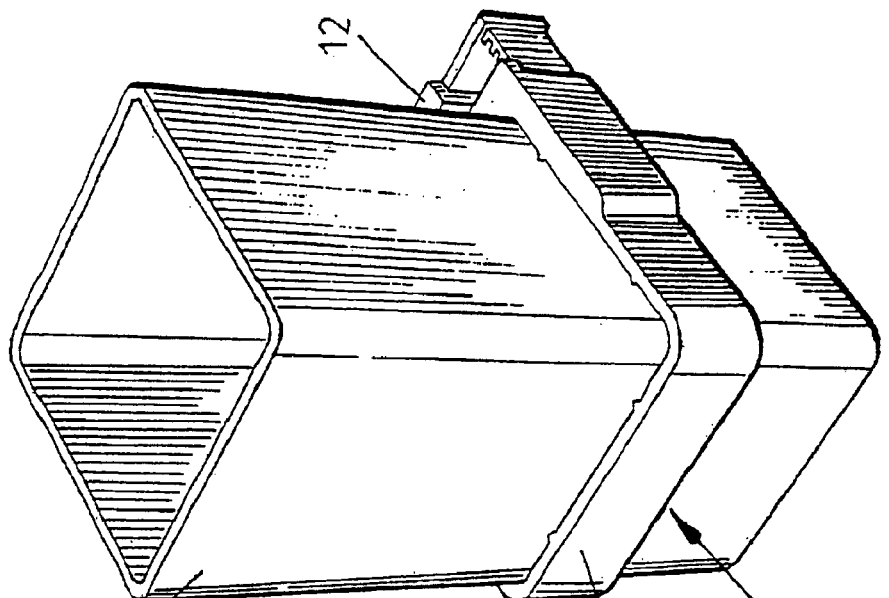
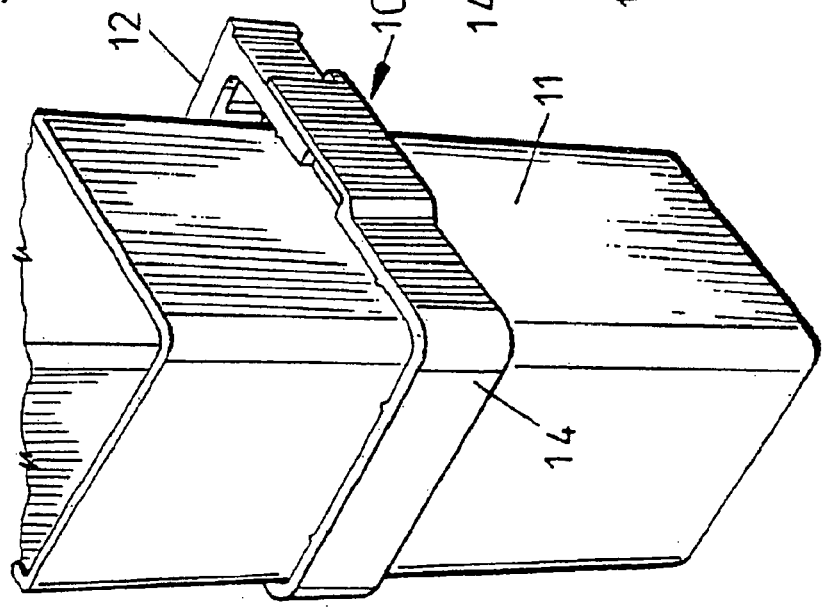

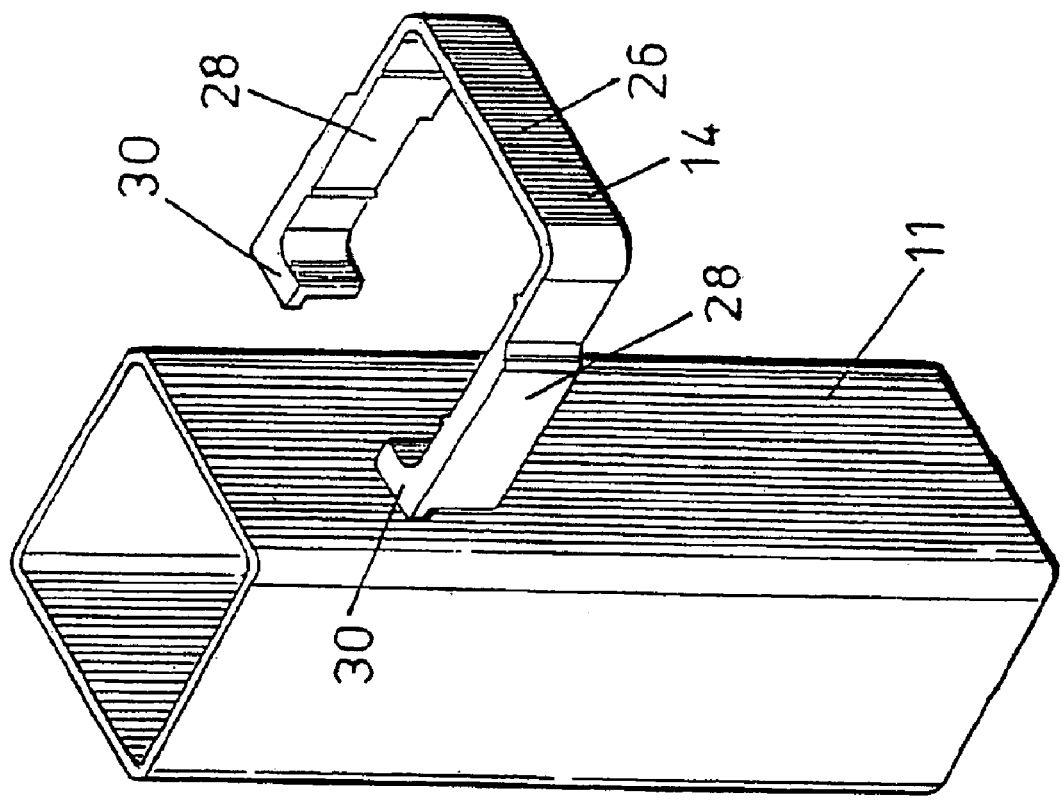
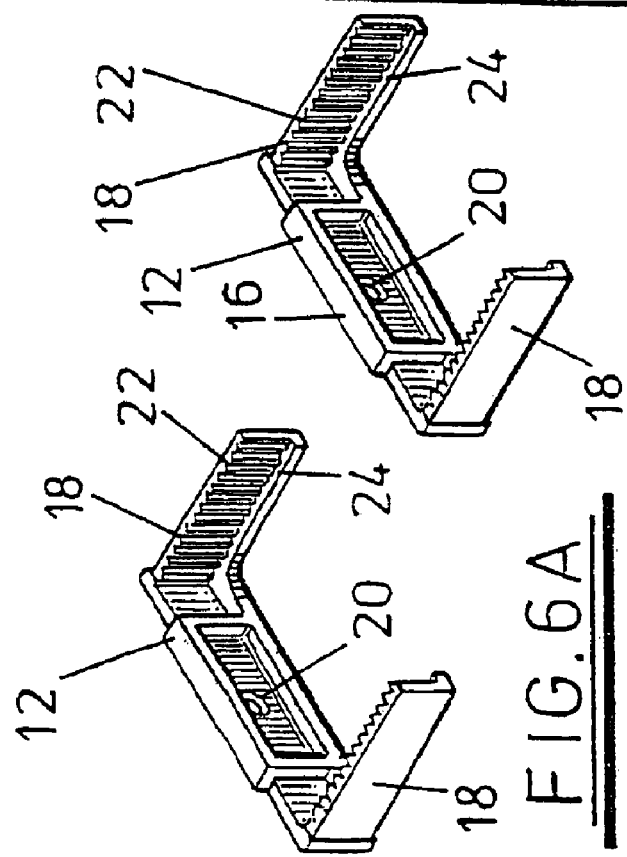

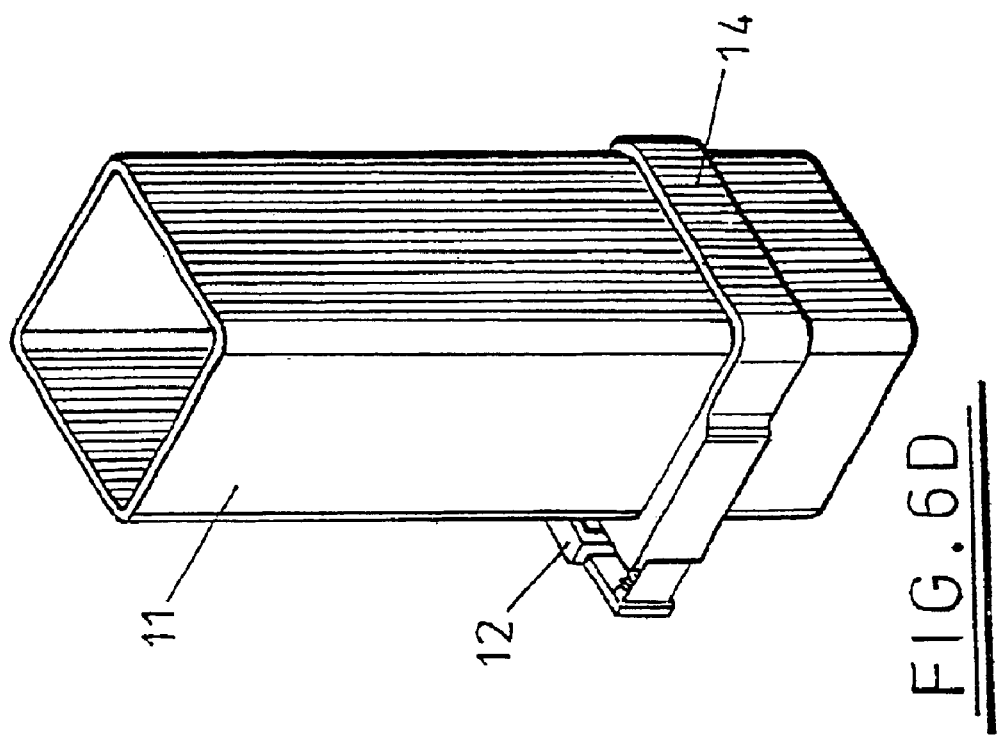
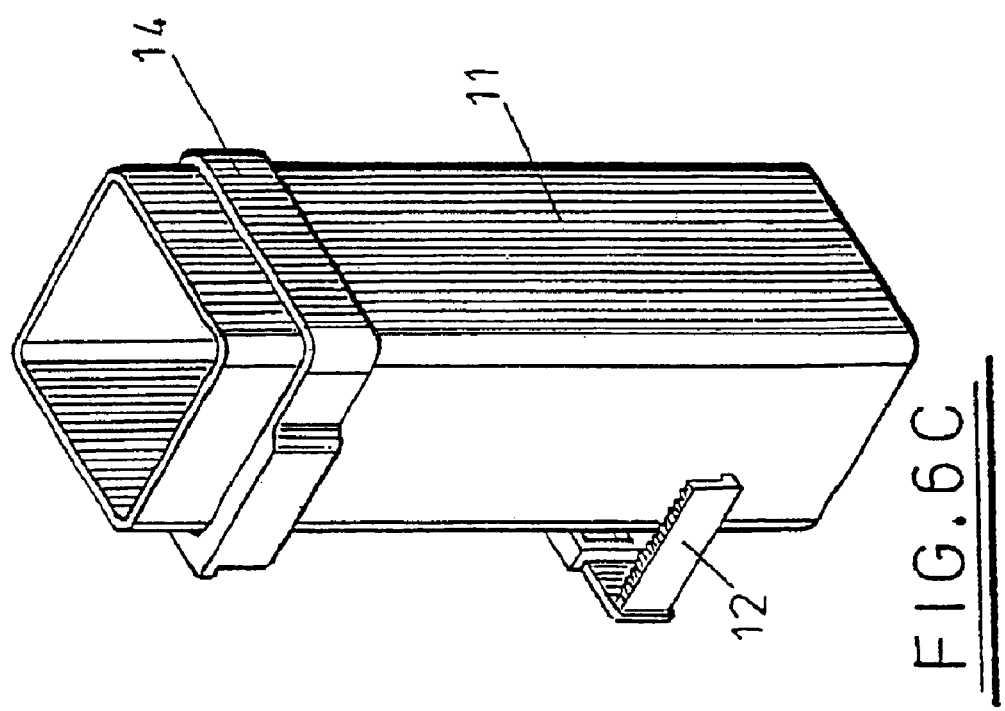

CONNECTING DEVICE

DESCRIPTION

This invention concerns connecting devices, especially connecting devices for attaching pipes or other elongate items to underlying surfaces, such as to walls.

A down pipe for delivering water collected in a gutter to a drain is usually attached to a wall using clips that are secured to the wall and fastened around the down pipe. Available clips are of one size and so do not allow for variations in spacing between the down pipe and the wall which occur due to irregularities in the wall and the relative positioning of the guttering to which the down pipe is connected at its top. Because of the above, sometimes clips cannot be fastened properly and so spring open or strain is put on the down pipe affecting its connection to the guttering or its other fastening clips.

An object of this invention is to provide a connecting device especially but not exclusively suitable for attaching a pipe to a surface.

A connecting device suitable for attaching a pipe to a surface comprising a first part fixable to the surface and a second part slidably attachable to the first part in the direction of the pipe to a limited extent and forming an at least partial enclosure for the pipe, the first and second parts having co-operating formations enabling the attachment of the second part to the first part to be selectably adjustable, whereby spacing of the pipe from the surface is adjustable.

The first part of the connecting device of the invention is preferably U-shaped providing a base which is arranged to be fixed to the surface, such as, for example, by means of one or more screws or the like through provided holes in the base, and arms extending from the base.

The second part of the connecting device of the invention is preferably also U-shaped having a base and an arm extending from each end of the base. The arms of the first and second parts of the connecting device of the invention are preferably selectively interengageable. The inner faces of the arms of one part preferably have a series of spaced teeth which are selectively engageable between corresponding teeth on outer faces of the arms of the other connecting device part.

The teeth of the outer faces of the arms of the other connecting device part, preferably the second part are preferably within channels in the arms, so that the arms of one part fit into the corresponding channels of the arms of the other part when the respective series of teeth are interengaged.

The respective series of teeth are preferably arranged so that the two parts of the connecting device of the invention can only be engaged to a limited extent in order to prevent them from slipping past each other. Thus, abutments may be provided on each arm for the teeth of an arm of the other part of the device with which it is to engage. The abutments may be provided by base strips from which the teeth of each arm extend. Alternatively, the teeth may be shaped, such as by being triangular in plan, whereby their extent of movement together is limited by said shaping.

The second part of the connecting device of the invention preferably has inwards returns at the ends of its arms, so that a pipe or the like is retained in said second part.

The connector device of the invention is preferably used by fixing the first part to a surface and sliding the second part onto a pipe and down onto the first part to engage the two parts and hold the pipe to the surface. The second part will engage the first part at a desired spacing from the pipe from the surface.

This invention will now be further described, by way of example only, with reference to the accompanying drawings, in which:

FIG. 1 is a perspective view from above of a down pipe connecting device according to the invention;

FIG. 2 is a perspective view from below of the connecting device of FIG. 1;

FIG. 4 is a perspective view from below of the connecting device of FIG. 1 fitted to a down pipe;

FIG. 5 is a perspective from above of the connecting device of FIG. 1 fitted to a down pipe;

Figure 3:
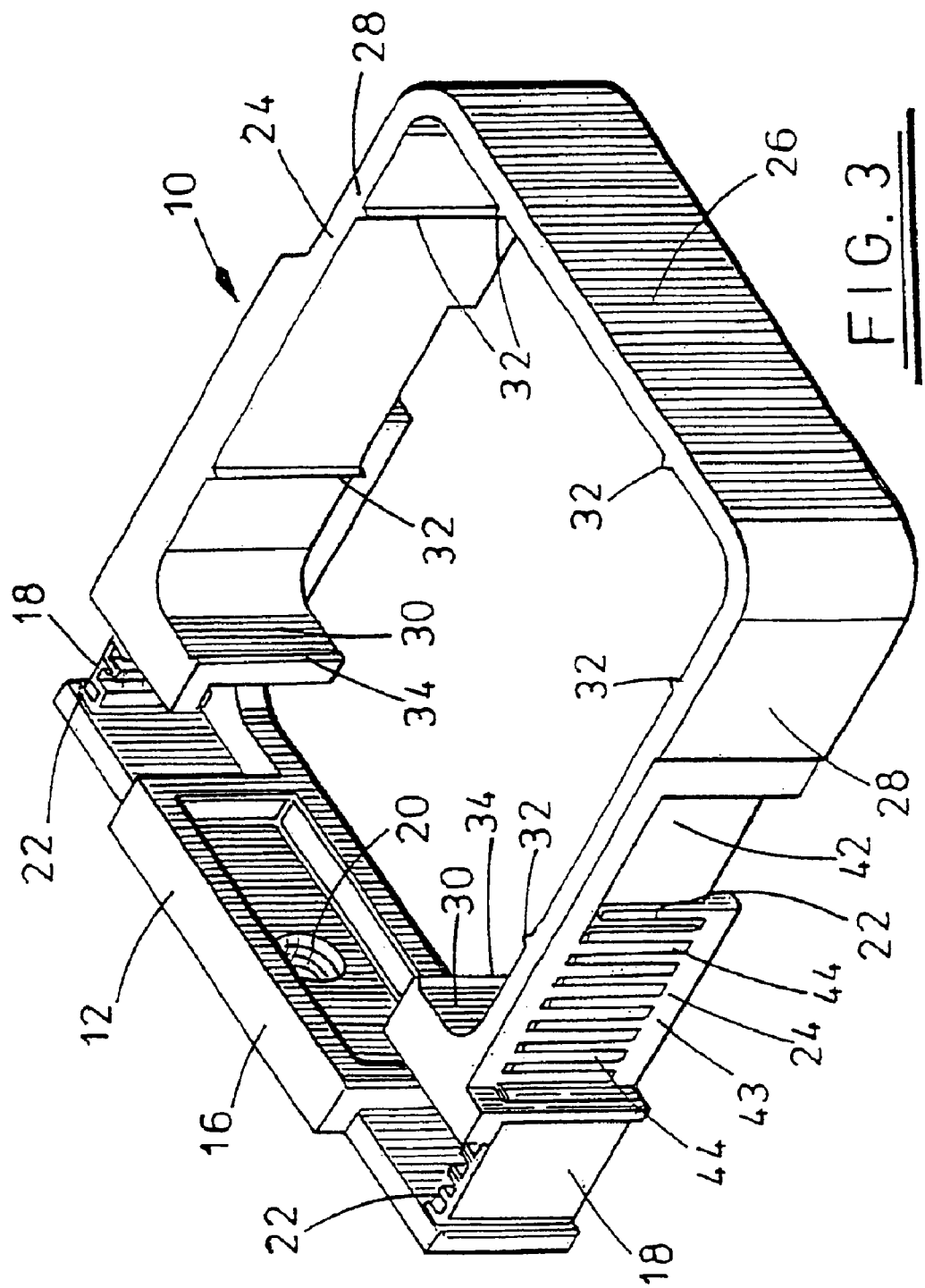
FIG. 3 is a part cut away perspective view from above of the connecting device of FIG. 1.

FIG. 6A to D shows steps in fitting a connecting device of FIG. 1 to a down pipe.

Referring to the accompanying drawings, a connecting device or clip 10 for securing a down pipe 11 to a wall or other surface, such as a mullion or corner post of a glazed conservatory wall, comprises two parts 12 and 14. The two parts 12, 14 are generally U-shaped and shaped to fit together in an overlapping fashion.

The one part 12 has a base 16 and sides 18 extending generally normally from the base. The base 16 is provided with a screw hole 20 so that it can be secured to a wall or other suitable surface. The sides 18 have on their facing surfaces spaced teeth 22 extending upwards from a base strip 24.

The other part 14 of the clip has a base 26 and sides 28 that turn inwards at their ends 30 to a small extent. The part 14 has its internal corners rounded to correspond to the shape of conventional cross section down pipes. Of course, the part 14 of the clip may be of any desired shape, such as to fit circular section pipes. On their internal surfaces, each of the base 26 and sides 28 has a pair of spaced ribs 32. Each of the ends 30 of the sides 28 also has on its internal surface at the end thereof a rib 34. The ribs 32 and 34 simply facilitate the fitting of a clip to a down pipe by reducing areas of contact and hence reducing friction between the clip and the down pipe.

The sides 28 of the second clip part 14 are wider over a major portion of their lengths up to their free ends and the wider portions are slotted from below to form channels 42 on one face 43 of each base strip 24 extend a series of teeth 44 shaped to interfit between the teeth 22 of the sides of the one part 12. Thus, the second part 14 can be slid down onto the first part 12 with the teeth 22 of the one part 12 engaged with the teeth 44 of the other part 14 at a desired position to give a desired spacing of the second part 14 from the base 16 of the first part 12. The respective base strips 24 limit the extent of interengagement of the teeth 22, 44.

The down pipe 11 has a longitudinal axis, which, as illustrated, is vertical. The teeth 22 and the teeth 44 co-operate to enable the attachment of the first part 12 to the second part 14 to be selectively adjustable and, once the second part 14 has been slidably attached to the first part 12, to limit slidable movement of the second part 14 relative to the first part 12, in a given direction, i.e., in a downward direction, but to permit slidable movement of the second part 14 relative to the first part 12 in an opposite direction, i.e., in an upward direction.

The clip 10 is used in the following manner as shown in FIGS. 6A to 6D of the accompanying drawings to fix a down pipe to a wall or other suitable surface. Firstly the first part 12 is fixed to the wall or other suitable surface at a desired location using a screw through the base 16. Then the second part is placed on the down pipe and the down pipe positioned, which may involve coupling thereof to a gutter. The second part of the clip is then slid down onto the first part so that their respective teeth interengage. The two parts of the clip may lock together simply by friction, by mechanical fixings or by engagement of integral locking components.

It will be appreciated that whilst the connecting device of the invention has been described in relation to connecting down pipes to a structure, the connecting device of the invention may be used for connecting other elongate items to an underlying structure in any orientation.

What is claimed is:

1. A connecting device suitable for attaching a pipe, which has a longitudinal axis, to a surface comprising:

a first part fixable to the surface and having two spaced sides;

a second part slidably attachable to the first part so as to be slidable along the longitudinal axis of the pipe and so as to capture the pipe within the first and second parts, said second part adapted to capture the pipe so as to be slidable along the pipe; and co-operating formations on said first and second parts, said co-operating formations both enabling the attachment of the first part to the second part to be selectively adjustable, so that spacing of the pipe from the surface is adjustable, and limiting slidable movement of the second part relative to the first part in a given direction along the longitudinal axis of the pipe when the pipe is captured by the second part, wherein said second part comprises a base connecting two spaced sides, and inwardly turned ends on said second part sides spaced from said base, wherein said base, sides, and inwardly turned ends of said second part slidably capture the pipe when disposed therein, and wherein said inwardly turned ends are located between said first part sides when said second part is attached to said first part.

2. The connecting device of claim 1, wherein said inwardly turned ends are spaced from one a another distance less than the dimension of said second part spaced sides.

3. The connecting device of claim 2, wherein said co-operating formations further permit slidable movement of the second part relative to the first part in the direction opposite said given direction once the second part has been slidably attached to the first part.

4. A connecting device suitable for attaching a pipe, which has a longitudinal axis, to a surface comprising:

a first part fixable to the surface;

a second part slidably attachable to the first part so as to be slidable along the longitudinal axis of the pipe and so as to capture the pipe within the first and second parts, said second part adapted to capture the pipe so as to be slidable along the pipe; and co-operating formations on said first and second parts, said co-operating formations both enabling the attachment of the first part to the second part to be selectively adjustable, wherein spacing of the pipe from the surface is adjustable, and limiting slidable movement of the second part relative to the first part in a given direction along the longitudinal axis of the pipe when the pipe is captured by the second part, wherein said second part comprises a base connecting two spaced sides, and inwardly turned ends on said sides spaced from said base, wherein said base, sides, and inwardly turned ends slidably capture the pipe when disposed therein, and wherein said first part is U-shaped with a base supporting two spaced sides, said first part base being fixable to the surface and said co-operating formations enabling the attachment of the first part sides to said second part sides with said second part inwardly turned ends extending toward one another and located between said first part sides.

5. The connecting device of claim 4, wherein said co-operating formations comprise spaced teeth in said first part sides and said second part sides.

6. The connecting device of claim 1, further comprising ribs on said second part base, spaced sides and inwardly turned ends, said ribs engaging the pipe when disposed therein.

7. The connecting device of claim 1, wherein said co-operating formations further permit slidable movement of the second part relative to the first part in the direction opposite said given direction once the second part has been slidably attached to the first part.

* * * * *